(12) United States Patent  
Campion

(10) Patent No.: US 9,087,308 B2
(45) Date of Patent: Jul. 21, 2015

(54) SYSTEM AND METHOD FOR CONDUCTING COMPETITIONS

(75) Inventor: Sean Campion, Lenexa, KS (US)

(73) Assignee: Appirio, Inc., San Francisco, CA (US)

( * ) Notice: Subject to any disclaimer, the term of this patent is extended or adjusted under 35 U.S.C. 154(b) by 1777 days.

(21) Appl. No.: 12/180,095

(22) Filed: Jul. 25, 2008

(65) Prior Publication Data

US 2010/0022306 A1    Jan. 28, 2010

(51) Int. Cl.
*G06Q 10/06* (2012.01)
(52) U.S. Cl.
CPC ...................................... *G06Q 10/06* (2013.01)
(58) Field of Classification Search
CPC ..... G06Q 10/06; G06Q 10/101; G06Q 50/01; G06Q 10/06315; H04L 63/0218; H04L 63/0272; H04L 67/42; H04L 67/10
USPC ................ 709/203–207, 223–224; 705/1, 37, 705/25–30; 463/42, 1, 30–40, 9
See application file for complete search history.

(56) References Cited

U.S. PATENT DOCUMENTS

| 7,574,496 B2* | 8/2009 | McCrory et al. ............... 709/223 |
| 7,971,047 B1* | 6/2011 | Vlaovic et al. ..................... 713/1 |
| 2003/0130021 A1* | 7/2003 | Lydon et al. ....................... 463/9 |
| 2003/0153386 A1* | 8/2003 | Lydon et al. ..................... 463/40 |
| 2004/0254809 A1* | 12/2004 | Teicher ............................. 705/1 |
| 2006/0259896 A1* | 11/2006 | Hanson et al. ................ 717/118 |
| 2007/0220479 A1* | 9/2007 | Hughes .......................... 717/100 |
| 2007/0226062 A1* | 9/2007 | Hughes et al. ................... 705/14 |
| 2007/0288107 A1* | 12/2007 | Fernandez-Ivern et al. .... 700/91 |
| 2008/0228681 A1* | 9/2008 | Hughes ............................ 706/21 |
| 2009/0260007 A1* | 10/2009 | Beaty et al. ........................ 718/1 |

* cited by examiner

*Primary Examiner* — Ruolei Zong
(74) *Attorney, Agent, or Firm* — Goodwin Procter LLP

(57) ABSTRACT

In general, in one aspect, a method for developing an asset by competition includes installing and configuring a master software environment for development or testing, and saving a copy of the master software environment as a virtual image suitable for use with a virtual machine. The method also includes receiving indicia of interest in a competition from a competitor, allocating a virtual server to the competitor and configuring the allocated virtual server with a copy of the virtual image, and providing access information for the virtual server to the competitor, thereby facilitating use of the virtual server by the competitor during the competition.

15 Claims, 6 Drawing Sheets

SYSTEM AND METHOD FOR CONDUCTING COMPETITIONS

TECHNICAL FIELD

This invention relates to computer-based methods and systems for facilitating the development of an asset.

BACKGROUND INFORMATION

Competitions have been held for the development of an asset, such as essays, music, computer software, and so on, and may be held for the development of any type of intellectual work or work product.

A larger work may be divided up into a number of smaller pieces, and competitions held for the development of those pieces. For example, a software program may be divided up into components, and competitions held for the development of each of the components. Likewise, the development of each component may be divided into design tasks and coding tasks, and a contest held for the design of the component, and another contest held for the coding of the component. A competition may be held for the assembly of such components into an application. A competition may be held for the identification and/or repair of faults in a software program. A competition may be held for the extension or addition of features to an existing program.

In some types of competitions, it can be beneficial to require or allow contestants to use particular tools (e.g., design tools, build programs, conversion tools, etc.), content (e.g., fonts, graphic images, text content, artifacts, etc.), and/or data (e.g., databases, data marts, spreadsheets, data streams). It may be difficult, unwieldy, burdensome, or costly to provide copies of these tools, content, or data to contestants. It also may be desirable to limit access and maintain control over such tools, content and assets.

In some software competitions, it may be necessary or desirable to have contestants use a particular development environment. Differences between a competition development environment and the intended end use development environment may result in undesired artifacts or errors. For example, for an application that is already developed, a competition may be held to add or change features of the program. There may be particular build or development tools and/or libraries used to build and/or run the software program. These tools/libraries may need to be configured in a particular manner.

In some software competitions, it may be necessary or desirable to have contestants use a particular testing environment. Differences between a competition testing environment and the intended production environment may result in undesired artifacts or errors. For example, in a competition to assemble an application from components, the assembled application may be required to work with specific middleware, database, and operating system, as well as other software. Even more, a specific configuration may be used in production, and if a different set of software and/or configurations for the software are used, errors or artifacts may become apparent in the production environment that were not evident in the contestant's testing environment.

It can be difficult and time-consuming for contestants to set up and configure their development and/or test environments prior to or during a competition. The burden of such set up and configuration can be a barrier to participation in a competition. Moreover, if done improperly, errors in set up or configuration can result in problems, which may be evident only after delivery or production.

SUMMARY OF THE INVENTION

Various asset development competitions have been used to develop assets, such as content, computer software, graphics, user interfaces, and so forth. Such competitions have been held, for example, by TOPCODER, INC. of Glastonbury, Conn., and may be seen at http://www.topcoder.com.

As described in co-pending U.S. patent application Ser. No. 11/035,783, entitled SYSTEMS AND METHODS FOR SOFTWARE DEVELOPMENT by John M. Hughes, filed Jan. 14, 2005, a software application may be developed by contest, where the task of developing the software application is divided up into discrete tasks, and competitions are held for the performance of each of the discrete tasks. For example, a software program may be divided up into components, and competitions held for the development of each of the components. Development of a component may be divided into design tasks and coding tasks, and a contest held for the design of the component, and another contest held for the coding of the component.

As described in co-pending U.S. patent application Ser. No. 11/655,768, entitled SYSTEM AND METHOD FOR DESIGN DEVELOPMENT by John M. Hughes, filed Jan. 19, 2007, design contests may be held, for example, for graphics design and user interface development as well as other types of designs and work product. Submissions in such contests may be evaluated for technical merit (i.e., meeting the described requirements) and/or based on customer affinity and/or appeal to a designated group of individuals.

As described in co-pending U.S. patent application Ser. No. 11/755,909, entitled PROJECT MANAGEMENT SYSTEM, by Messinger et al., filed May 31, 2007, a series of contests may be managed through use of project management system. Portions of a contest, such as a review effort, may begin when submissions are received, deadlines are met, and so on. Such contest systems can provide contest-related information to contest administrators as well as potential competitors.

In various embodiments, configured environments are made available to competitors during one or more competitions, to enable development and/or testing of work product by competition.

For example, in general, in one aspect, a master environment for use during a competition is installed and configured. This may involve installing and/or configuring one or more of an operating system, middleware, database, software-based tools and/or content. Once installed and configured, the master environment may be saved as a virtual image such as an image suitable for use with a virtual machine.

As each contestant provides indicia of interest in participating in a competition, a virtual server may be allocated to the contestant and configured with a copy of the master environment image. Virtual machine access information is provided to the contestant, for example, an internet address and/or authentication credentials for the allocated virtual server. The contestant then uses the virtual server with the configured environment to participate in the competition.

After some time, typically after the contestant's participation in the competition and submission of an entry and/or after the close of the competition, the virtual server may be unallocated to allow for allocation to another contestant in the same or a different competition. The virtual server contents as modified by the contestant may be archived for a period of time, so that the contents can be provided to the contestant at a later time, for example for follow-up work, for forensic purposes, or for a later competition.

In some cases, the same virtual server may be used by more than one contestant in the same competition. For example, the virtual server may be used by a first contestant to participate in the competition, and then reallocated and configured for a second contestant after the first contestant has indicated that his competition submission is complete.

In some cases, the virtual server may be allocated to an individual for a number of competitions that use the same environment. In some cases, a contestant may be able to request that an environment be archived, so that it can be recalled if needed for that competition, or for another competition using the same environment.

In general, in another aspect, a competition registration system includes a virtual machine image, the virtual machine image including an environment for use in a competition. When contestants register for a competition that requires the environment, the competition registration system allocates a virtual server and configures the virtual server with the virtual machine image. The competition registration system then provides the contestant with access indicia for the virtual server on which the image has been installed. The contestant then accesses and uses the server (e.g., for development and/or testing) as necessary during the competition. After the virtual server is not needed (e.g., at the end of the competition, at the end of a number of competitions, at the user's request), the server is unallocated and made available for use in the same or a different competition.

In general, in another aspect, a method for developing an asset by competition includes installing and configuring a master software environment for development or testing, saving a copy of the master software environment as a virtual image suitable for use with a virtual machine, and associating the virtual image with a competition, for example within a competition management system. Upon indicia of interest in the competition (e.g., upon registration for the competition) a virtual server is allocated to a competitor that is configured with a copy of the virtual image. The competitor may the use the virtual server for the competition, for example, for the development of a submission or the testing of a submission. The virtual server for each competitor may be unallocated after the competitor has submitted a competition submission. In some embodiments in which reviewers review competition submissions, a virtual server configured with the copy of the virtual image may be allocated to each reviewer as they are assigned to the competition. The virtual server for each reviewer may be unallocated after the reviewer has completed his or her review.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
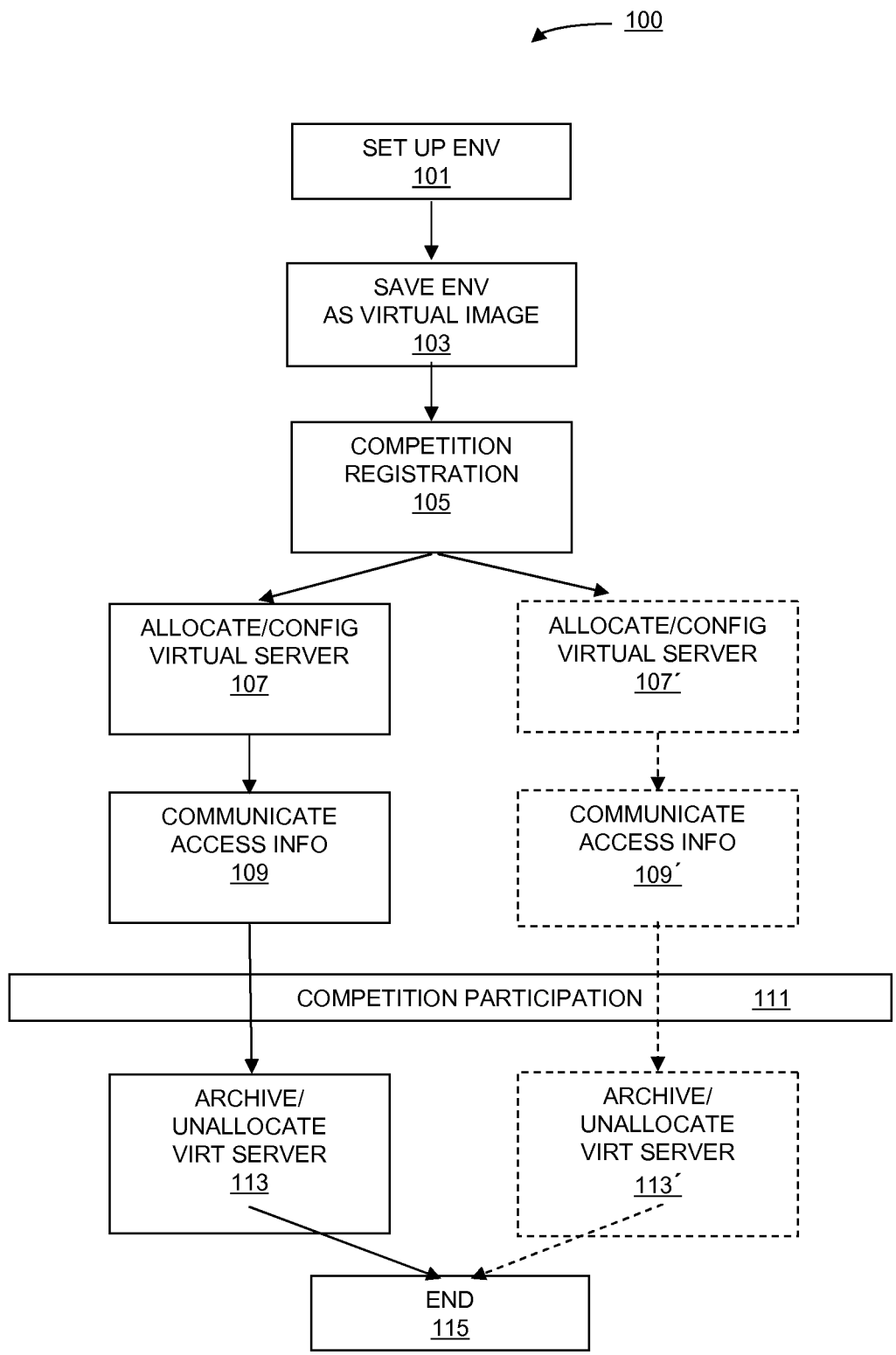
FIG. 1 is a flowchart illustrating by example a method according to an embodiment of the invention.

Referring to FIG. 1, in some embodiments, a method 100 for developing an asset by competition may be applicable to any type of asset. Just as examples, not intended to be limiting, in various embodiments, the asset developed by competition may be or may include text, content, graphics, translations, customizations, design, development, data, architecture, and/or specifications, for software, hardware, audio, video, music, machines, equipment, devices, and/or media. The competition may be any suitable competition. Just as examples, not intended to be limiting, the competition may be an on-line competition, in-person competition, live competition, and/or timed competition. In some embodiments, the competition is an on-line competition for the development of a portion of a computer software application, such as a design for computer code, computer code based on a design, or a user interface design.

Some types of competitions, such as competitions to build/assemble subassemblies of components and/or applications from components (and that are to run in a particular environment) and competitions that involve working on an existing component or application, such as bug identification competitions (e.g., competitions to find application errors), bug fixing competitions (e.g., competitions to identify the cause of and/or repair faults), testing competitions (e.g., competitions to develop tests to test the application), application/user interface update competitions (e.g., to develop modifications and/or additional features for existing applications) and so on, can particularly benefit from providing a suitable, pre-configured environment for each competitor to build and/or test their submission.

Typically, a competition involves participants competing to develop an asset, which may be a standalone asset, or a set of changes (e.g., patches, modifications) to another asset. A specification describes requirements for an asset and may also include competition rules and logistics information. Standards may be specified for the asset and may be specific to the type of asset. Standards may be described for example, in a checklist or scorecard, and may be general or specific as appropriate. In some embodiments, a review of an asset is conducted using the specification and the standards in order to identify a competition winner, and the review criteria include the relevant standards.

In various embodiments, a master environment for use during a competition is installed and configured (STEP 101). The environment may include such elements as an operating system, middleware (e.g., application server, services framework), data (e.g., SQL database server, data warehouse, data mart, data stream receiver), software tools (e.g., compilers, build scripts, design tools, utilities, converters, source code control) and/or content (e.g., fonts, languages, graphics, source code). Any type of installation or configuration may be performed as needed or desired. As non-limiting examples, the configuration may include the arrangement and installation of software in particular directories or files, setting parameters for the installed software, configuration or installation files, authentication parameters and tokens, and so on. Once installed and configured, the master environment is saved as an image for example an image suitable for use with a virtual machine (STEP 103).

Virtualization is a software technology in which software is used to simulate a hardware device. As two examples of commercially available virtualization systems VMWARE is offered by VMWARE, INC. of Palo Alto, Calif. and XEN-SERVER is offered by CITRIX SYSTEMS of Ft. Lauderdale, Fla. Using virtualization, a physical computer has one or multiple virtual machines, which are each isolated software containers that can run their own operating systems and applications as if they were a physical computer. A virtual machine behaves like a physical computer and contains it own virtual (i.e., software-based) CPU, RAM hard disk and network interface card (NIC). An operating system can't tell the difference between a virtual machine and a physical machine, nor can applications or other computers on a network.

With some virtualization technology, a single computer can run a number of different virtual machines, with each virtual machine having different software or a different instance of the same software. A virtual server in this context is comprised of server software running on a virtual machine.

With most virtualization systems, it is possible to create a package of software and/or configuration files, referred to as an image, which can be installed and run on a virtual machine. In this way, virtual servers running specific software and configurations can be rapidly provisioned. Typically, an image includes one or more software package files and one or more configuration files. Often, the virtual server system includes a mechanism for taking a snapshot of the files and configurations, which are then converted into the format for such an image.

In some cloud computing solutions, a large number of virtual machines are made available to customers on demand. These virtual machines may be on the same or different physical computers, which may in turn be in the same or different geographic locations. The cloud is presented as a (practically) inexhaustible supply of virtual machines that may be used as needed. Customers of the cloud computing infrastructure can allocate, configure, use, and unallocate virtual machines by making requests to the cloud infrastructure.

For example, the ELASTIC COMPUTER CLOUD (EC2), offered by AMAZON.COM, INC. of Seattle, Wash. provides an infrastructure in which an Amazon Machine Image (AMI) image file can be uploaded to the Amazon system, and then installed and run on a virtual server using a series of web services requests. This image file can include applications, libraries, data, content, source code, access/authentication tokens, and associated configuration settings.

Other examples of services that allow for virtual provisioning in the cloud include the GOGRID service offered by SERVEPATH LLC and the APPNEXUS service from APPNEXUS, INC. Each of these services provide command line or application interfaces to allow for automated provisions. For example, GOGRID provides a web service that allows administrators to control their interaction with the cloud hosting infrastructure through a two-way programmatic communication interface. Exemplary GOGRID API use cases include auto-scaling server networks, listing assigned public and private IP addresses, deleting servers, and listing billing details.

In various embodiments, the master environment image may be stored in a location that is accessible to a competition management system and/or one or more virtual machines. For example, it may be stored in a data store that is accessible to a cloud computing environment, such that web services requests may be made of the cloud computing environment to provision a server with the master environment image.

With respect to the competition, contestants may provide indicia of interest in participating in the competition (STEP 105). Any suitable indicia may be used. For example, the indicia may comprise registration or other commitment to participate in the competition, a request to access the development or test environment, submission of prerequisite documents, such as a confidentiality agreement, intellectual property licenses and/or assignments, tax documentation, and so forth and/or other indicia. Having environments available can be particularly useful for competitions to develop tests for a software program, to identify faults in a program, to repair one or more faults in a program, to update a software program, and to assemble a software program, but again, the method may be used with any suitable competition or project.

Upon receipt, and optionally confirmation, of the indicia, a virtual server may be allocated to the contestant and configured with a copy of the master environment (STEP 107). For example, the competition provider may have one or more virtual machines running on a computer or network of computers, and the competition provider may simply maintain an internal list of virtual server that are available and those that are allocated. One of the available servers is allocated, and the image installed on the virtual server. Authentication information is generated for that virtual server.

As another example, a computing cloud solution may be used, in which the competition management system communicates, for example using internet protocols (e.g., TCP/IP protocols, web services protocols), telephone/modem communications or some other method, and requests allocation of a virtual server, provisioning of the server with the master environment, and so on.

It should be understood that although the figure shows two instances of allocation/configuration (STEP 107, STEP 107'), one for each of two competitors, this is intended to illustrative, and there may be any number of contestants. The virtual servers may be allocated to the different contestants at the same time, or at different times, for example as the contestants communicate the indicia, as available, after all registrations have been received, or in any other suitable manner.

Access information for the configured virtual server is provided to the contestant (STEP 109). This access information may be, for example, an internet address and/or authentication credentials for the allocated virtual server. In some cases, passwords or other authentication credentials may be set automatically by the competition management server when the server is configured. For example, once the virtual server is running, the configuration management system may log in to the server as an administrator or using default information, and change authentication credentials from a default setting to a random or predetermined value.

In some cases, the access information is just the internet address for the virtual server. Each contestant already has an assigned username/password that is used to access the competition system, and these authentication credentials are used to access the virtual server. Again the competition management system can manually configure the username and password. The image also may configure the virtual server to use authentication credentials provided by the competition management system for authentication. In some embodiments, the software in the image is configured to randomly generate the authentication credentials, and to communicate the credentials (e.g., by email, by web service request, or otherwise) to the competition server.

The contestant then uses the access information to access the virtual server with the configured environment and participate in the competition (STEP 111). For example, as a few non-limiting examples, the competitor may use such communication tools as telnet/ssh, xwindows terminal, remote desktop, and so on to access the virtual server. Again, as a few non-limiting examples, the competitor may build software, test software, configure software, fix bugs in software, identify bugs in software, create graphics, etc.

After some time, typically after the contestant's participation in the competition, or the close of the competition, the virtual server may be unallocated (STEP 113). This may allow for allocation of that virtual server to another contestant in the same or a different competition. The unallocation may be accomplished by administrative commands to the computer running the virtual server, by requests to the cloud computing infrastructure, or by some other suitable mechanism. The unallocation may be accomplished by shutting down the virtual server, and deleting the allocation from an allocation list (which allocation list may be in a text file, database, or any other suitable list).

The contents of virtual server as modified by the contestant may be archived for a period of time, so that that image can be reallocated to the contestant, for example for follow-up work, or for forensic purposes. In some cases, the same virtual server may be used by more than one contestant in the same competition, by unallocating and reallocating the server, or by restarting the virtual server with the original image and reconfiguring.

In some cases, the virtual server may be allocated to an individual for a number of competitions that use the same environment. In some cases, a contestant may be able to request that an environment be archived, so that it can be recalled if needed for that competition, or for another competition using the same environment.

In some embodiments, reviewers are assigned to review the work of the competitors. For example, there may be a single reviewer, or a review board of 2, 3, 4, or more reviewers who complete scorecards to evaluate the competition submissions. In some cases, depending on the competition, in can be helpful to provide reviewers with an environment in which they can review the submissions. This may include the same environment as the competitors, and may also include software and tools useful for the review, such as the scorecards, testing and analysis tools/frameworks, access to additional infrastructure and so on.

In some embodiments, a virtual server configured with the copy of the master image may be allocated to each reviewer as the review is assigned to be a reviewer for the competition. The virtual server is allocated and configured for the competition. The virtual server for each reviewer may be unallocated after the reviewer has completed his or her reviews. It also may be beneficial for the reviewer to start with a "clean slate" for each review. For example, in some cases, the reviewer may need to download and install submissions that provide changes to the environment under test. In such cases, it would be better for the reviewer to restart the virtual server using the unchanged master image, which may in some cases be accomplished by unallocating and reallocating the virtual server after each review.

In some embodiments, at the conclusion of a competition (e.g., after the deadline for submission), all virtual machines are shut down and unallocated. The virtual machines for the reviewers are then allocated (if they have not been already), and the reviewers can receive the submissions from the competition management system and review the submissions.

In some embodiments, when a winner is selected, a new virtual machine is automatically allocated for the winner to build and test any "final fixes," that is, changes that are required by the reviewer(s) to the winning submission. In some embodiments, the winning competitor is allocated a new virtual server, with a fresh copy of the master image. In some embodiments, the competitor's image is archived prior to unallocation, and then is reallocated, and that archived image used to provide the competitor with a copy of the virtual server as it was last left by the competitor. In some embodiments, the virtual servers are not unallocated until a winner has been declared, and at that time all of the competitors' virtual servers are unallocated except for the winner.

When the competition, including all reviews, are complete, all virtual machines associated with the competition may be unallocated.

In some embodiments, customers, competition sponsors, managers, administrators, or anyone else associated with the competition may be provided with a virtual machine configured with the master image for the competition, so that they may build and/or test the submissions. In one embodiment, an administrator with sufficient privileges can manually request from the competition management that a virtual machine be allocated and configured with the image associated with the competition.

In one demonstrative, exemplary implementation, software is developed for a customer. The customer may be in the same organization or a different organization than the software developer(s) that built the software. The software may be any type of software, but in this example, the software is a software application. When the software application is complete and delivered, the environment to build the software and/or the environment to run and test the software is saved as a virtual image. The virtual image is stored. If software support is needed, for example if one or more faults are identified, the virtual image is readily available to be associated with the project to repair the fault(s). If, for example, the software will be supported by conducting a competition to repair the fault, it is possible to easily provide each competitor with a build/test environment. This can be accomplished without the need to access the customer's site or software.

For example, it may be possible to conduct a competition in which a fault is described as reported by the customer, and the competitors need to identify the cause and submit a "patch" or other modification that will repair the fault.

In this example, the image may be built from a final build and/or final production environment. In some cases, it may be beneficial to build the image with the final software, but with simulated data, so that sharing the software does not share the data.

In another demonstrative, exemplary implementation, the customer, when engaging in a support contract, has an image taken of the production environment. When support is needed, the image can be used to support the software. For example, the image may be used as described to conduct competitions to repair identified faults with the software.

In another demonstrative, exemplary implementation, a customer wishes to engage in a fault identification of its software. An administrator takes an image of the production environment. A competition may be held to identify flaws in the software, for example, ways in which the software does not meet the specifications. Competitors may be paid a fixed amount for each type of flaw and location identified. Each competitor may be provided with an environment in which they can build and/or test the of the software.

In another demonstrative, exemplary implementation, a customer wishes to engage in a security review of its software. An administrator takes an image of the production environment. A competition may be held to identify security flaws in the environment. Competitors may be paid a fixed amount for each type of flaw and location identified. Each competitor is provided with an environment in which they can test the security of the software.

It should be understood that there may be limits placed on the number of environment copies that may be made available at the same time. For example, example, if commercial software products are incorporated into the environment, there may be a need to purchase sufficient licenses for the number of copies that will be used. This will depend on the licenses in use. For this reason, and in other circumstances, it may be useful to have the management system track and/or limit the number of copies of a particular environment made available at the same time.

The provisioning of virtual images of a software application also may be useful for training. For example, it may be possible to allow members of a team who will be using an application (for example at the administration level) or supporting an application to have access to a practice build and/or test environment for the purposes of learning how the application functions and operates. The use of the virtual servers in this context allows for the easy configuration of entire environments for such purposes.

Figure 2:
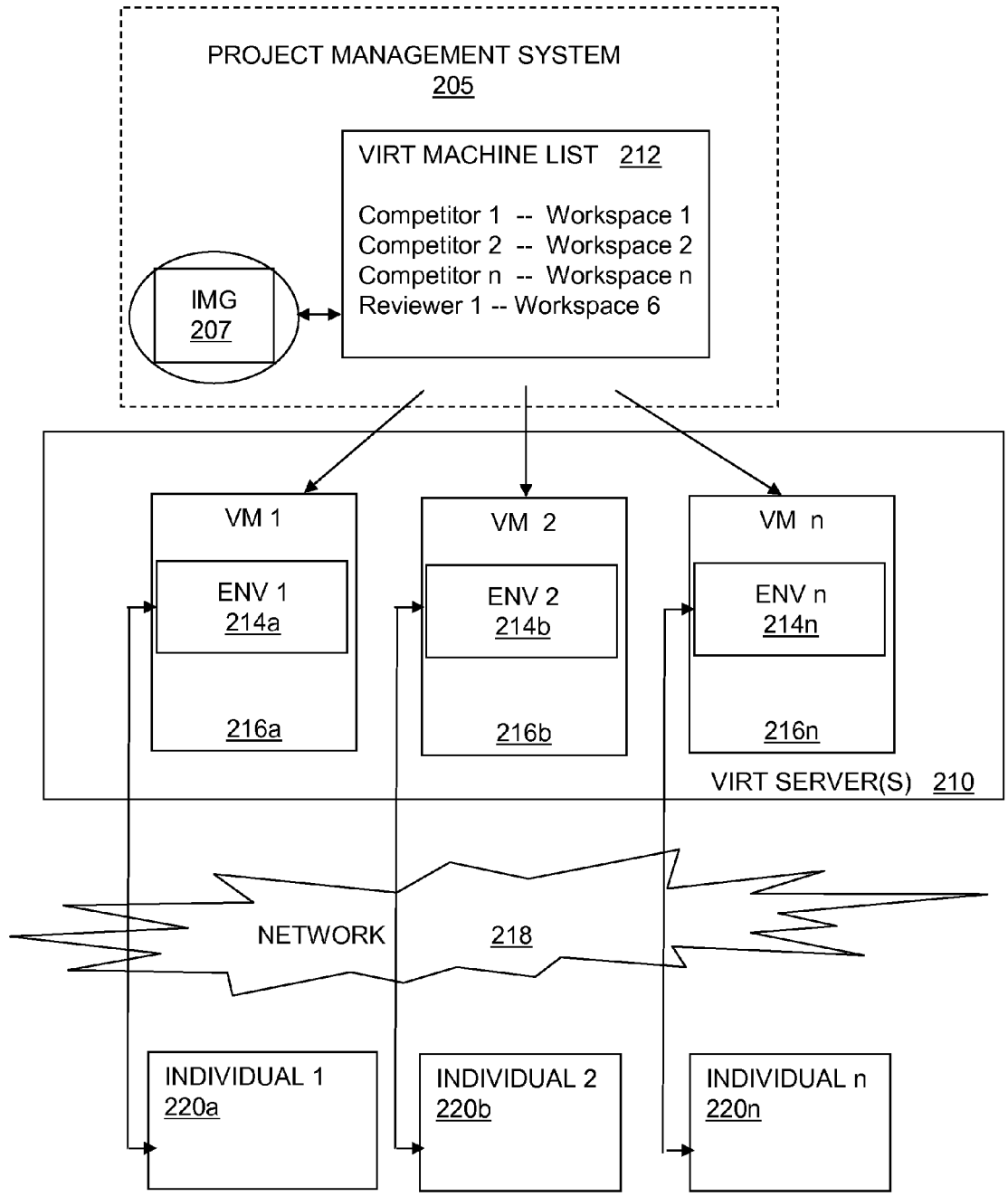
FIG. 2 is a block diagram illustrating by example a system according to an embodiment of the invention.

Referring to FIG. 2, in some embodiments, a project management system 205 includes the capability to associate a virtual machine image 207 with a project to be worked on by a number of individuals, where the image includes an environment for use by the individuals in working on the project. A duplicate of the environment may be made available to each of the individuals involved with that project at an appropriate time in order to facilitate collaborative and/or parallel development by those individuals. In some embodiments, the project management system provides a capability to associate individuals (e.g., shown by example as competitor 1, competitor 2, competitor 3) with a project. The project management system can upon request or upon predetermined deadlines or milestones allocate virtual machines (216a, 216b, 216n) to the individuals, and configure the virtual machines with the image associated with the project (214a, 214b, 214n), thereby providing an environment that is suitable for work on the project. Upon the completion of the work by an individual (or upon further deadlines or milestones), the virtual machine for each individual may be unallocated for use by others on the same or a different project. In some embodiments, the management system allows roles to be assigned to the individuals, and for virtual machines to be allocated based on the individuals' roles, as well as the deadlines and/or milestones.

Such a system has general applicability with all types of projects and project management systems. For example, the system may be useful as part of an RFP process, in which a customer would like potential developers, contractors, and vendors to review the software program and the desired changes, as well as the environment in which it will be built. When a developer, contractor, or vendor is selected, the environment also may used as the working environment to allow the developers, contractors, or vendors for the project.

The system also has great benefit when used in combination with competitions or as part of a competition registration/management system.

Figure 3:
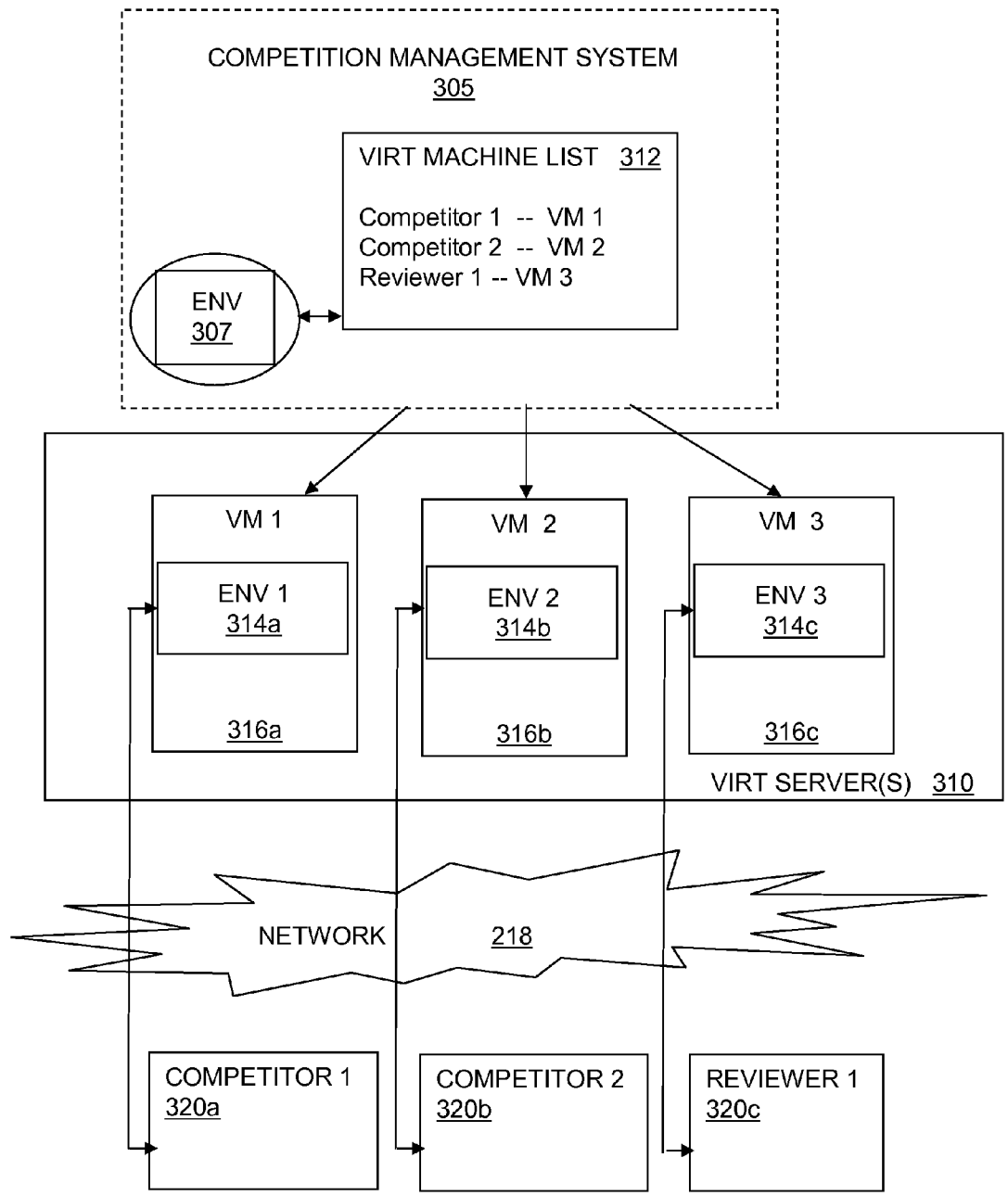
FIG. 3 is a block diagram illustrating by example a system according to an embodiment of the invention.

Referring to FIG. 3, the system 205 (FIG. 2) may be used with or incorporated into a competition management system 305, which includes or has access to a virtual machine image. The virtual machine image includes an environment for use in a competition. It should be understood that there typically would be a number of images if there were a number of ongoing competitions, and that one image is shown for simplicity.

When contestants register for a competition that requires the environment, the competition registration system allocates a virtual server (316a, 316b) and configures the virtual server with the virtual machine image 307. The competition registration system then provides the contestant with access indicia for the virtual server (316a, 316b) on which the image has been installed (314a, 314b). The contestant then may access and use the virtual server (e.g., for development and/or testing) during the competition. After the virtual server (316a, 316b) is not needed (e.g., at the end of the competition, at the end of a number of competitions, at the user's request), the virtual server (316a, 316b) is unallocated and made available for use in the same or a different competition.

Likewise, a virtual server (316c) may be allocated for one or more reviewers, represented in the figure by example as Reviewer 1 (320c). Reviewer 1 is allocated virtual machine VM 3 (316c), which has been configured (314c) with the environment image 307. The virtual machine VM3 may be allocated to the reviewer when the reviewer is assigned and/or at the time that the review is needed.

Figure 4:
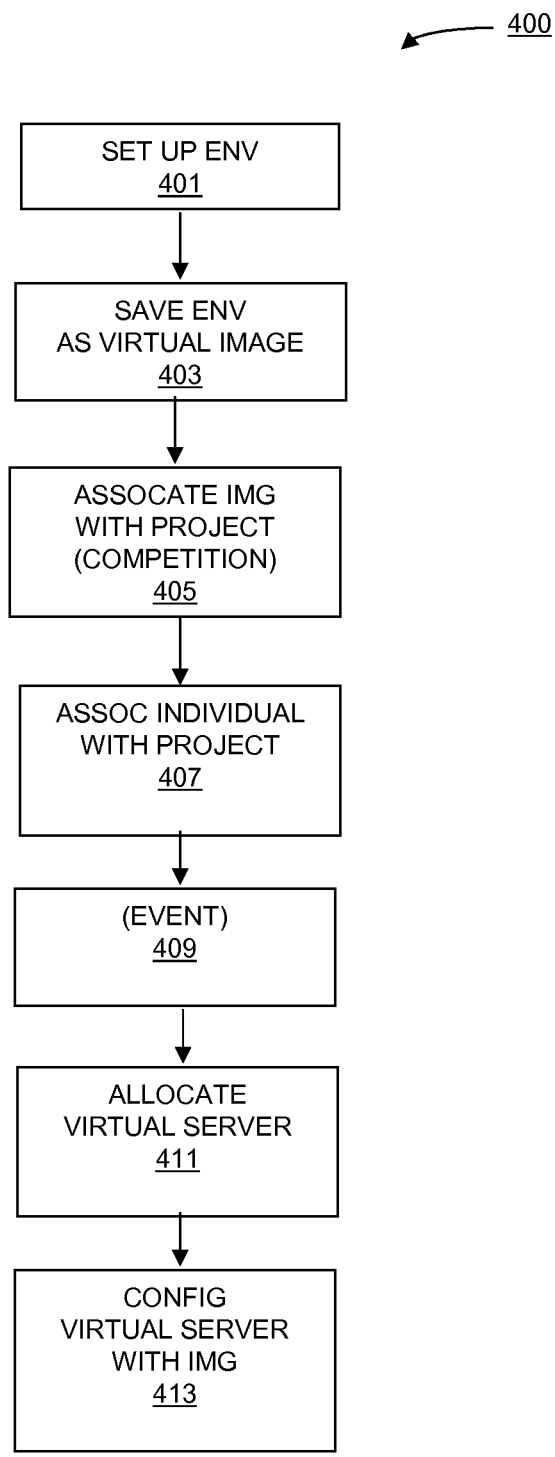
FIG. 4 is a flowchart illustrating by example a method according to an embodiment of the invention.

Referring to FIG. 4, in some embodiments, a master environment is installed and configured (STEP 401). As a non-limiting example, the environment may be a development or testing environment for use in a competition. A copy of the environment is saved as a virtual image suitable for installation on a virtual machine. The image is associated with a project. The project may be any type of project. In various embodiments, the project may be a competition or number of competitions. The project may be a number of related competitions.

An individual is associated with the project (STEP 407). This can be set manually, by subscription by the individual, or by any other suitable mechanism. The individual may be associated with the project based on receipt of indicia of interest in the project. The individual may register for the project. Upon the occurrence of an event (STEP 409) a virtual server is allocated to the individual (STEP 411) and configured with the image (STEP 413). The event may be any type of event. The event may be the same event that causes association of the individual with the project (STEP 407). For example, registration for a project that is a competition may result in association of the individual with the competition (STEP 407) and may be the event (STEP 409) that triggers allocation of the virtual server (STEP 411) and configuration (STEP 413). The event may also be a deadline that is reached, a date/time and/or project milestones that are reached.

For example, as described above, in a project that is a competition, a reviewer may be associated with a competition (STEP 407) upon designation in a competition management system as a reviewer. At a predetermined time (STEP 409), which may be (as a few non-limiting examples) at the start of the competition, a time before review, or when review is ready to begin, a virtual server is allocated (STEP 411) and configured (STEP 413) for the reviewer. The event (STEP 409) may be a predetermined time and/or the reaching of additional milestones.

Figure 5:
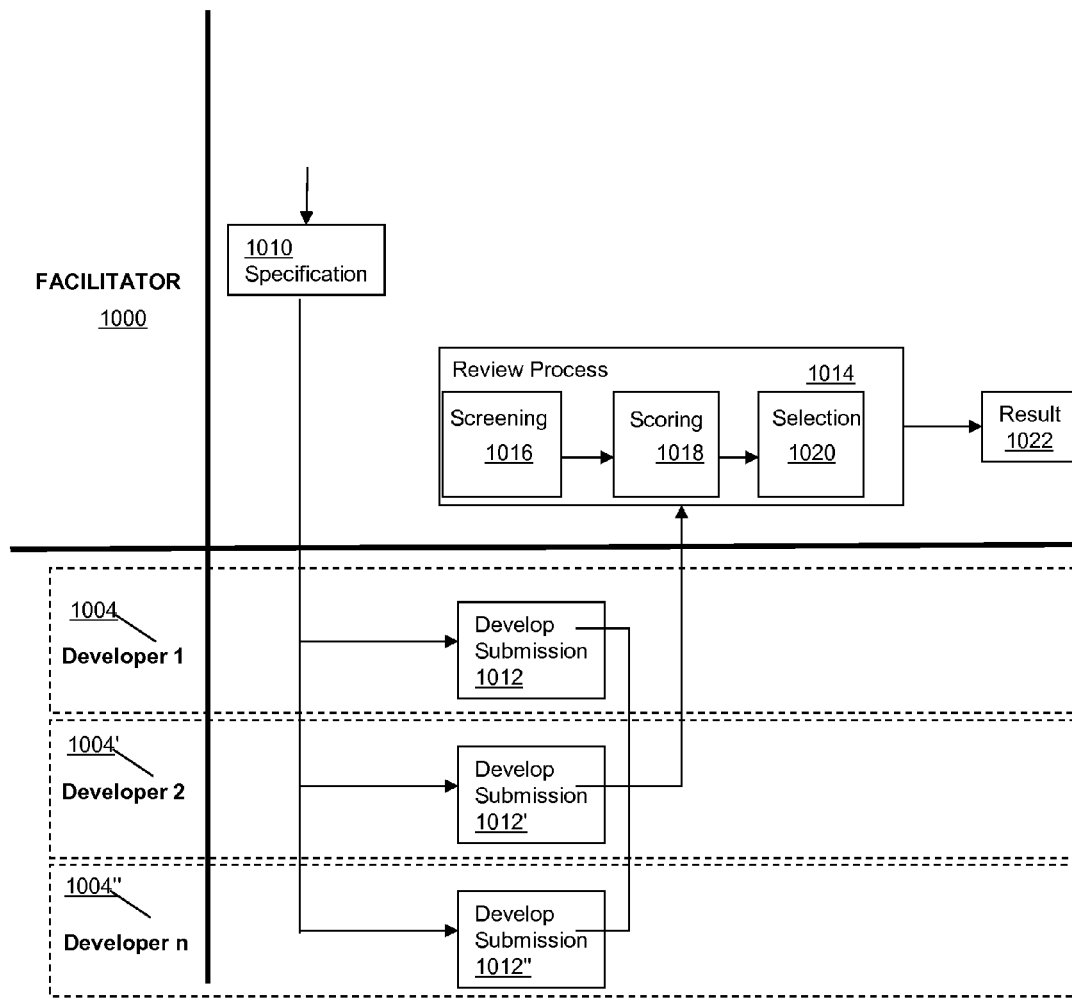
FIG. 5 is a block diagram illustrating by example an embodiment of a development contest.

Referring to FIG. 5, in one embodiment, one possible generalized implementation of a competition for the development of an asset is shown. It should be understood that this implementation is but one of many possible examples of competitions for which the methods and systems described may be applied, and that other types of competitions also may be used. The asset may be any sort or type of asset that may be developed by an individual or group. As non-limiting illustrative examples related to software, an asset may be a software program, logo, graphic design, specification, requirements document, wireframe, static prototype, working prototype, architecture design, component design, implemented component, assembled or partially-assembled application, testing plan, test cases, test code, documentation, and so on. As non-limiting examples unrelated to software, an asset may be a computer hardware or electronics design, or other designs such as architecture, construction, or landscape design. Other non-limiting examples include written documents and content such as documentation and articles for papers or periodicals (whether on-line or on paper), research papers, scripts, multimedia content (including without limitation video, audio, graphics images, cartoons, sounds, graphical presentations, business presentations, etc.), legal documents, and more.

In some embodiments, the development process is monitored and managed by a facilitator 1000. The facilitator 1000 can be any individual, group, or entity capable of performing the functions described here. In some cases, the facilitator 1000 can be selected from the distributed community of contestants based on, for example, achieving exemplary scores on previous submissions, or achieving a high ranking in a competition. In other cases, the facilitator 1000 may be appointed or supplied by an entity requesting the development, and thus the entity requesting the competition oversees the competition.

The facilitator 1000 has a specification 1010 for an asset to be developed by competition. In general, a specification 1010 is intended to have sufficient information to allow contestants to generate the desired asset. In some embodiments, the specification has been made available to potential competitors for review and feedback as described with reference to FIG. 1 and FIG. 2. In some cases, the specification 1010 may include a short list of requirements. In some cases the specification may include the result of a previous competition, such as a design, wireframe, prototype, and so forth. In some cases, the specification may be the result of a previous competition along with a description of requested changes or additions to the asset. The facilitator 1000 may review the specification 1010, and format or otherwise modify it to conform to standards and/or to a development methodology. The facilitator 1000 may in some cases reject the specification for failure to meet designated standards. The facilitator 1000 may mandate that another competition should take place to change the specification 1010 so that it can be used in this competition. The facilitator 1000 may itself interact with the entity requesting the competition for further detail or information.

The facilitator specifies rules for the competition. The rules may include the start and end time of the competition, and the awards(s) to be offered to the winner(s) of the competition, and the criteria for judging the competition. There may be prerequisites for registration for participation in the competition. In some cases, the specification may be assigned a difficulty level, or a similar indication of how difficult the facilitator, entity, or other evaluator of the specification, believes it will be to produce the asset according to the specification. In some cases, in addition to the technical requirements, competition rules and logistics may be included in (or even if separate, considered part of) the competition specification.

The specification is distributed to one or more developers 1004, 1004', 1004" (generally, 1004), who may be members, for example, of a distributed community of asset developers. In one non-limiting example, the developers 1004 are unrelated to each other. For example, the developers may have no common employer, may be geographically dispersed throughout the world, and in some cases have not previously interacted with each other. As members of a community, however, the developers 1004 may have participated in one or more competitions, and/or have had previously submitted assets subject to reviews. This approach opens the competition to a large pool of qualified developers.

In some embodiments, the communication of the specification can occur over a communications network using such media as email, instant message, text message, mobile telephone call, a posting on a web page accessible by a web browser, through a news group, facsimile, or any other suitable communication. In some embodiments, the communication of the specification can be accompanied by an indication of the rules including without limitation the prize, payment, or other recognition that is available to the contestants that submit specified assets. In some cases, the amount and/or type of payment may change over time, or as the number of participants increases or decreases, or both. In some cases submitters may be rewarded with different amounts, for example a larger reward for the best submission, and a smaller reward for second place. The number of contestants receiving an award can be based on, for example, the number of contestants participating in the competition and/or other criteria.

The recipients 1004 of the specification can be selected in various ways. In some embodiments, members of the community may have expressed interest in participating in a particular type of asset development competition, whereas in some cases individuals are selected based on previous performances in competitions, prior projects, and/or based on other methods of measuring programming skill of a software developer. For example, the members of the community may have been rated according to their performance in a previous competition and the ratings may be used to determine which programmers are eligible to receive notification of a new specification or respond to a notification. The community members may have taken other steps to qualify for particular competitions, for example, executed a non-disclosure agreement, provided evidence of citizenship, submitted to a background check, and so forth. Recipients may need to register for a competition in order to gain access to a finalized competition specification.

In one embodiment, a facilitator 1000 moderates a collaborative discussion forum among the various participants to answer questions and/or to facilitate development by the contestants. The collaborative forum can include such participants as facilitators, developers, customers, prospective customers, and/or others interested in the development of certain assets. In one embodiment, the collaboration forum is an online forum where participants can post ideas, questions, suggestions, or other information. In some embodiments, only a subset of the members can access and/or post to the forum, for example, participants in a particular competition or on a particular team.

Upon receipt of the specification 1010, one or more of the developers 1004 each develop assets to submit (shown as 1012, 1012' and 1012") in accordance with the specification 1010. The development of the assets can be accomplished using any suitable development tools or system, depending, for example, on the contest rules and requirements, the type of asset, and the facilities provided. For example, there may be specified tools and/or formats that should be used.

Once a developer 1004 is satisfied that her asset meets the specified requirements, she submits her submission, for example via a communications server, email, upload, facsimile, mail, or other suitable method.

To determine which asset will be used as the winning asset as a result of the contest, a review process 1014 may be used. A review can take place in any number of ways. In some cases, the facilitator 1000 can engage one or more members of the community and/or the facilitator and/or the entity requesting the asset. In some embodiments, the review process includes one or more developers acting as a review board to review submissions from the developers 1004. A review board preferably has a small number of (e.g., less than ten) members, for example, three members, but can be any number. Generally, the review board is formed for only one or a small number of related contests, for example three contests. Review boards, in some embodiments, could be formed for an extended time, but changes in staffing also can help maintain quality. In some embodiments, where unbiased peer review is useful, the review board members are unrelated (other than their membership in the community), and conduct their reviews independently. In some embodiments, reviewers are allocated such that they only infrequently work on the same contests.

In some embodiments, one member of the review board member is selected as a primary review board member. In some cases, a facilitator 1000 acts as the primary review board member. The primary review board member may be responsible for coordination and management of the activities of the board. In some embodiments, the customer and/or facilitator 1000 serves as the only review board member(s).

In some embodiments, a screener, who may be a primary review board member, a facilitator, or someone else, screens 1016 the submissions before they are reviewed by the (other) members of the review board. In some embodiments, the screening process includes scoring the submissions based on the degree to which they meet formal requirements outlined in the specification (e.g., format and elements submitted). In some embodiments, scores are documented using a scorecard, which may be a document, spreadsheet, online form, database, or other documentation. The screener may, for example, verify that the identities of the developers 1004 cannot be discerned from their submissions, to maintain the anonymity of the developers 1004 during review. A screening review 1016 may determine whether the required elements of the submission are included (e.g., all required files are present, and the proper headings in specified documents). The screening review can also determine that these elements appear complete.

In some embodiments, the screening 1016 includes a preliminary substantive review and selection/elimination by the entity that requested the competition. For example, if the competition is for a wireframe, the entity may select the wireframes that seem to be the best. This smaller group may then go on to the next step.

In some embodiments, the screener indicates that one or more submissions have passed the initial screening process and the reviewers are notified. The reviewers then evaluate the submissions in greater detail. In preferred embodiments, the review board scores the submissions 1018 according to the rules of the competition, documenting the scores using a scorecard. The scorecard can be any form, including a document, spreadsheet, online form, database, or other electronic interface or document. There may be any number of scorecards used by the reviewers, depending on the asset and the manner in which it is to be reviewed.

In some embodiments, the scores and reviews from the review board are aggregated into a final review and score. In some embodiments, the aggregation can include compiling information contained in one or more documents. Such aggregation can be performed by a review board member, or in one exemplary embodiment, the aggregation is performed using a computer-based aggregation system. In some embodiments, the facilitator 1000 or a designated review board member resolves discrepancies or disagreements among the members of the review board.

In one embodiment, the submission with the highest combined score is selected as the winning asset 1020. The winning asset may be used for implementation, production, or for review and input and/or specification for another competition. A prize, payment and/or recognition is given to the winning developer.

In some embodiments, in addition to reviewing the submissions, the review board may identify useful modifications to the submission that should be included in the asset prior to final completion. The review board documents the additional changes, and communicates this information to the developer 1004 who submitted the asset. In one embodiment, the primary review board member aggregates the comments from the review board. The developer 1004 can update the asset and resubmit it for review by the review board. This process can repeat until the primary review board member believes the submission has met all the necessary requirements. In some embodiments, the review board may withhold payment of the prize until all requested changes are complete.

In some embodiments, a portion of the payment to a developer of one asset in a series of assets is withheld until the until after other competitions that make use of the asset are complete. If any problems with the asset are identified in the further competitions, these are provided to the reviewer(s) and the developer, so that appropriate changes can be made by the developer 1004.

There can also be prizes, payments, and/or recognition for the developers of the submissions other than first place submissions. For example, the contestants that submit the second and/or third best submissions may also receive payment, which in some cases may be less than that of the winning contestant. Additional prizes may be awarded for ongoing participation and/or reliability. Payments also may be made for creative use of technology, submitting a unique feature, or other such submissions. In some embodiments, the software developers can appeal the score assigned to their design, program, or other submissions.

It should be understood that the development contest model may be applied to different portions of work that are required for the development of an overall asset. A series of development contests is particularly applicable to assets in which the development may be divided into stages or portions. It can be beneficial in many cases to size the assets developed in a single competition such that work may be completed in several hours or a few days. The less work required to develop a submission, the lower the risk for the contestants that they will not win.

Figure 6:
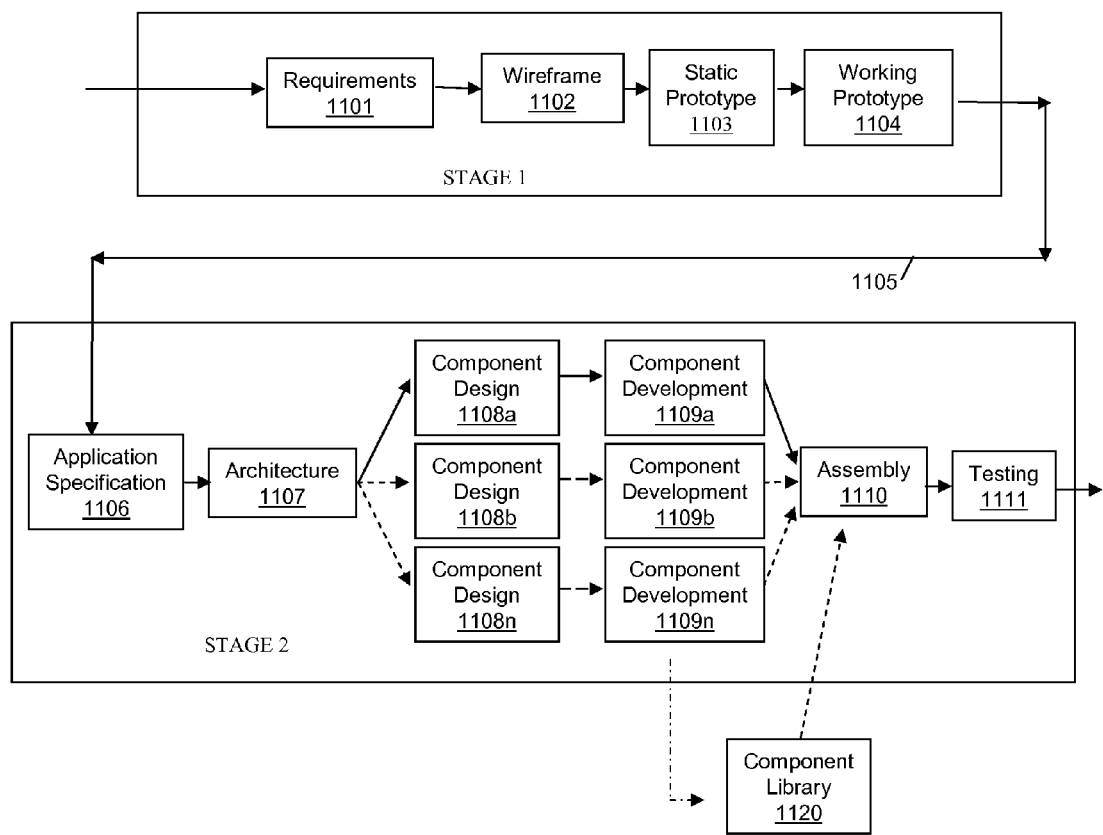
FIG. 6 is a block diagram illustrating by example an embodiment of a contest-based software application development process.

Referring to FIG. 6, in one illustrative example of a series of competitions, steps for development of a software application are shown. While described as an illustrative example in some places as a web application, it should be understood that any sort of software application, with any type of architecture, including without limitation mobile applications, client/server applications, thin-client applications, to give a few examples, may be suitable for this type of development process.

A series of contests may be held to develop the software application. For example, a person, referred to as a customer, may have an idea or concept for a software application. The idea may be, for example, thought-out in detail or only with a high level of description. A series of development competitions (with each such competition, for example, operating as shown with respect to FIG. 3) may be held, starting with the specification of the concept. For example, a contest may be held for the development of application requirements 1101. In such a contest, the initial description and documentation provided by the customer may be used as part of the contest specification 1010 (FIG. 3). The asset to be developed in the competition is the application requirements documentation. It may be that the contestants need to interact with the customer to develop the requirements. Typically, this interaction would take place on a forum that is open to all of the contestants. The review of the requirements may involve one or more peer reviewers (i.e., members of the contestant community), as well as the customer. The selection of a requirements document may be based on the degree to which it represents the concept presented, the actual desires of the customer, and technical understanding and feasibility.

The requirements documentation that is developed in the requirements contest 1101 may then be used as part of the contest specification 1010 (FIG. 3) for a wireframe competition 1102. The wireframe contest 1102 may be held for the development of a wireframe (e.g., a visual guide used to suggest layout and placement of fundamental design elements in the interface design) of the application. The wireframe typically lays out the interface of the application, and presents visually the way that a user will interact with the application software. The review of the wireframes may involve one or more peer reviewers (i.e., members of the contestant community), as well as the customer. The selection of a wireframe may be based on the degree to which it implements the requirements, the actual desires of the customer, and technical understanding and feasibility.

When the wireframe contest 1102 is complete, a contest may be held for the development of a static prototype (e.g., an implementation of a web site in HTML or other markup language, typically without data persistence or other server-based functionality) using the wireframes as a starting point. The static prototype shows screen displays as they would look in the application, but does not have implemented functionality. The review of the static prototype may involve one or more peer reviewers (i.e., members of the contestant community), as well as the customer. The selection of a static prototype may be based on the degree to which it implements the requirements, the actual desires of the customer, and technical understanding and feasibility.

When the static prototype contest 1103 is complete, a contest may be held for the development of working prototypes (e.g., working implementations) based on the static prototypes. The working prototype is code that implements the requirements, wireframes, and static prototypes, along with any other comments or instructions provided by the customer. This working prototype may have certain restrictions or requirements that are described in the contest specification 1010 (FIG. 3). The working prototype may not need to be highly scalable, or enterprise quality, but merely good enough to try and permit customer use.

By having a customer involved in the requirements for and selection of the deliverables, a contest-based development process results in the efficient creation of software that the customer is happy with. At any stage in the process, if a customer is not happy with the final results, the customer can hold another contest to revise the previous asset with new or changed requirements.

The working prototype may be sufficient for some customers 1105 as a useful application. For others, the working prototype is a first step for confirming the desired requirements for a software application. Once they have used and tested the functionality of the working prototype, the working prototype may be used as the input to another series of competitions for development of an enterprise quality software application.

Shown as "STAGE 2" in the figure, another series of contests, beginning with the development of an application specification 1106 based on the working prototype may be held. In some such embodiments, a contest for development of an application specification 1106 may be held. The contest specification 1010 (FIG. 3) may include the winning working prototype and information about changes requested from the working prototype. Other information that may be included in the contest specification 1010 (FIG. 3) may include the required format and scope of the application specification. In one embodiment, the application specification is a requirements specification, including screen displays, functionality description, and so forth. A customer may participate on a review board for a specification, particularly to fill in any gaps, or to clarify any problems with the inputs to the specification competition. Of course, the specification competition could be held without a working prototype (if STAGE 1 is skipped) or just using wireframes and/or static prototypes as input. Likewise, a customer may just develop its own specification, and/or engage a consultant to develop a specification.

Once the winning application specification is selected, it may be used as the contest specification 1010 (FIG. 3) for an architecture competition. The asset(s) that may be developed as part of the architecture competition may include an overall architectural design, as well as a description of components that may be used to build the application. An architectural design may include a description of new components that may be built as part of other competitions 1108, 1109, or as existing components from a component library 1120. When a winning architecture is selected, the resulting component specification(s) may be used as input for component design competition(s) 1108. A customer may participate on a review board for an architecture competition, particularly if the customer has architecture expertise. The customer may be particularly interested in the interfaces and integration with its other systems. Typically, it is useful to have skilled architects working on the review board for an architecture competition, to identify technical issues with the architectural design.

In some embodiments, the components specified in the winning architecture may be developed by holding a series of component design competitions 1108. The winning component designs are then used as input for component development competitions 1109. As illustrative examples, component design and development competitions have been described, for example, in the above-referenced U.S. patent application Ser. No. 11/035,783. When all components have been completed, they may be assembled in assembly competitions 1110. Finally, test scripts may be developed, tested, and run in testing competitions 1111. At the completion of STAGE 2, an enterprise-ready software application that meets the requirements is completed.

In some embodiments, reusable assets may be provided to increase the speed of development in each of the various stages. For example, templates, graphics, tools, design patterns, and so forth may be used to increase the productivity of the contestants, and to give a common style to make evaluation and integration easier.

It should be understood that one, two, or more of the steps may be performed in a different order, or combined or omitted. For example, in STAGE 1, there may not be a need for a requirements competition 1101. Rather, the contestants in the wireframe may start from the description provided by the customer, and ask questions in a forum or otherwise to generate their wireframes, without use of more formal requirements documentation. Likewise, there may be at any stage multiple competitions and/or multiple levels of competitions. For example, for a complex application, there may be an overall architecture design, and then individual competitions for the architecture design of subassemblies. The architecture of the subassemblies may be designed, needed components built, and the subassemblies assembled. The subassemblies may then be assembled into complete application in an additional competition or competitions. Testing competitions may be held for various portions of an application, for example, for a subassembly, or for a distinct portion of an application, such as a user interface with another competition held for testing of back-end functionality.

It also should be understood that development by a series of competitions is flexible, in that contests can be repeated if the results were not as expected, or if additional changes or new functionality is desired. Likewise, a customer can undertake as much work as it likes through development by other methods, for example, by using internal staff or outside consultants. For example, rather than holding a contest 1104 for a working prototype, a customer can take the static prototype, and develop the working prototype itself.

In some embodiments, where the assets developed outside of the contest environment are being used as the input to another contest, it may be useful to engage reviewers to review the asset. For example, a static prototype review can be conducted on a static prototype developed by a customer before that static prototype is used as input to the working prototype contest 1104. As another example, in STAGE 2, an entity might develop a specification itself, engage reviewers to review the specification, make any desired changes, then use the specification in a contest for some or all of the architecture, hold a contest for development of some or all of the components, and then assemble the application itself. A review can be conducted on the assembly, and a testing competition held to develop test scripts and other functionality.

In some embodiments, a "project plan" competition may be held prior to the competitions described. In the project plan competition, contestants develop a plan for development of the customer's project needs. For example, the plan may specify a series of development contests and timeframes for developing the desired software application. The plan may provide approximate costs, based on historical or other data, for similar competitions. The plan may include development strategies, and assumptions about customer participation. A project plan may be specified as a series of competitions, which may then be monitored through interaction with a competition management server. One asset developed in such a plan may be a configuration of contests as specified in a project management system, such as that described in co-pending U.S. patent application Ser. No. 11/755,909.

In one embodiment, a competition web site provides a registration process for a development project. Following project registration, a customizable dashboard, or "cockpit" is configured with a variety of functional widgets with which a customer can begin the process of having development work done by a member community. The customer can launch competitions and track projects through delivery and member payment. In some embodiments, the web site project-specific public or private 'group' pages, generated by the customer from the cockpit, on which the nature of the project can be described, relevant attachments can be viewed, and the customer can openly communicate with members via a bulletin board or forum to answer questions, receive suggestions, and so on. In some embodiments, these pages allow participants to see the evolution of the project, interact, collaborate, provide status reports, and make delivery.

In some embodiments, representatives of a customer, and members in different roles, may have access to different capabilities for the project. For example, some customers may be able to post projects, while others may only be able to review status, and other review and approve payments.

In some embodiments, a dashboard page serves as an entry point for customers to interact with the TopCoder Community. From this dashboard page, a registered customer may launch and track projects, send and receive messages and monitor a variety of information sources. The dashboard may include a profile box with information about the individual, and a link to other information, or to update the information, a button that allows the launching of a project, a button or link for help and "how-to" information, navigation to other pages, such as contests and discussion forums, and in some cases space for broadcast messages or advertising, search field, and so forth. In some implementations, the page is customizable, with a framework allowing for "widgets" to be dragged and dropped into place into a user-configured order.

In some embodiments, the dashboard includes an interface that provides information about the user's projects, which maybe updated dynamically, such as the project name, the status of the project, the name of the personnel associated with the project, the status of the project, the status of payments, the number of contest participants, the number of submissions, the project phase, whether there are new forum posts (and in some cases, information or a link to the post(s)).

In some embodiments, the dashboard includes a messaging interface that indicates whether new messages are waiting, and allows a user to compose new messages. In some embodiments, a team information interface shows information about individuals who are working on a current project, or, for example, a past project, or have been designated for another reason to be included. An RSS feed interface provides an indication of whether content has been added to a particular web page. A news interface provides information about new features, or, for example, newly-available components that may be used in a competition.

General Applicability

Although described here with reference to software, and useful when implemented with regard to software assets, the cooperatively developed asset can be any sort of tangible or intangible object that embodies intellectual property. As non-limiting examples, the techniques could be used for computer hardware and electronics designs, or other designs such as architecture, construction, or landscape design. Other non-limiting examples for which the techniques could be used include the development of all kinds of written documents and content such as documentation and articles for papers or periodicals (whether on-line or on paper), research papers, scripts, multimedia content (including without limitation video, audio, graphics images, cartoons, sounds, graphical presentations, business presentations, etc.), legal documents, and more.

What is claimed is:

1. A method for developing an asset by competition, comprising:

installing and configuring a master software environment for development or testing of a software asset in an online competition;

saving a copy of the master software environment as a virtual image suitable for use with a virtual machine in a cloud computing infrastructure;

receiving indicia of interest in the online competition for development or testing of the software asset from a plurality of competitors;

in response to the receipt of the indicia of interest in the competition, automatically allocating a virtual machine in a cloud computing infrastructure to each of the competitors and configuring the allocated virtual machines with a copy of the virtual image, each virtual machine configured to provide elements of the master software environment to the respective competitor via the virtual image for use in development or testing of the software asset by the respective competitor during the competition;

automatically communicating access information for each of the allocated virtual machines in the cloud computing environment to the respective competitors via a communications network, thereby providing the competitors with use of a virtual machine configured with an identical copy of the master software environment for the competition; and upon selecting a winner of the online competition, allocating to the winner a virtual machine configured with the master software environment for building and testing changes required by a reviewer of a winning submission made by the winner during the competition.

2. The method of claim 1 wherein the environment comprises an operating system.

3. The method of claim 1, wherein the environment comprises an application server.

4. The method of claim 1, wherein the environment comprises a database.

5. The method of claim 1, further comprising archiving at least one of the allocated virtual machines as a virtual machine image after it has been modified by the competitor associated therewith.

6. The method of claim 5, further comprising storing the archived virtual machine image for a period of time.

7. The method of claim 1, further comprising unallocating at least one of the virtual machines following use thereof during the competition.

8. The method of claim 6, wherein the virtual machine allocated to the winner comprises the archived virtual machine image.

9. The method of claim 1, wherein the same virtual machine is used by more than one competitor during the same competition.

10. The method of claim 1, wherein the same virtual machine image is used by the same competitor in multiple competitions.

11. The method of claim 1, further comprising allocating a virtual machine in a cloud computing infrastructure to each of a plurality of reviewers, wherein the virtual machines allocated to the reviewers are configured with a copy of the virtual image of the master software environment to facilitate review of submissions made by the competitors in the competition.

12. A method for developing an asset by competition, comprising:

installing and configuring a master software environment for development or testing of a software asset in an online competition;

saving a copy of the master software environment as a virtual image suitable for use with a virtual machine;

associating the virtual image with the online competition;

automatically allocating a virtual server configured with a copy of the virtual image for each competitor in the competition thereby providing each competitor with use of a virtual server configured with an identical copy of the master software environment for the competition, each virtual server configured to provide elements of the master software environment to the respective competitor via the virtual image for use in development or testing of the software asset by the respective competitor during the competition; and upon selecting a winner of the online competition, allocating to the winner a virtual machine configured with the master software environment for building and testing changes required by a reviewer of a winning submission made by the winner during the competition.

13. The method of claim 12, wherein the virtual server for each competitor is unallocated after the competitor has submitted a competition submission.

14. The method of claim 12, further comprising, for each reviewer in the competition, allocating a virtual server configured with the copy of the virtual image.

15. The method of claim 12, wherein the virtual server for each reviewer is unallocated after the reviewer has completed his/her review.

* * * * *